UNITED STATES PATENT OFFICE.

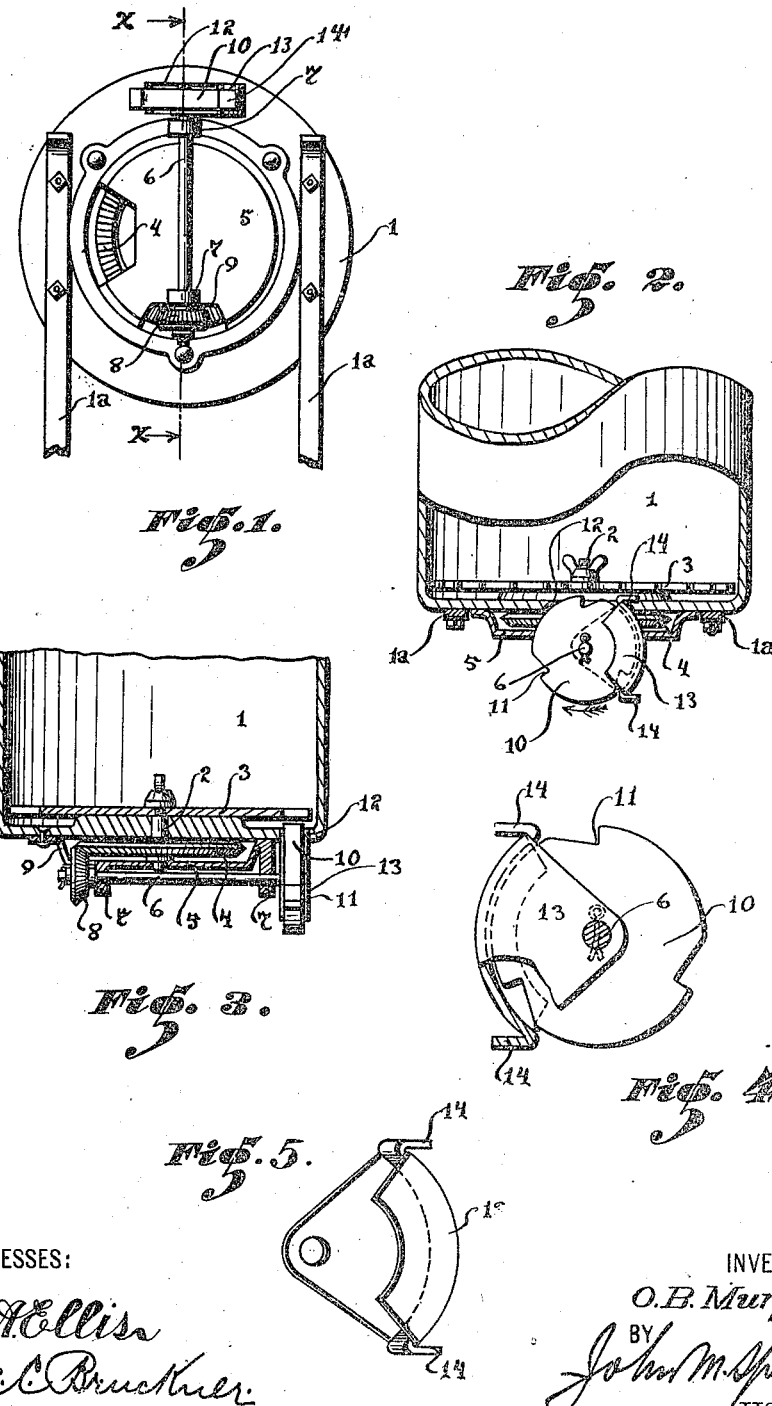

OSCAR B. MURPHY, OF DUKE, OKLAHOMA, ASSIGNOR OF ONE-FOURTH TO W. W. MAPLES AND ONE-FOURTH TO S. L. LOCKER, BOTH OF DUKE, OKLAHOMA.

SEED-PLANTING MECHANISM.

1,147,039.   Specification of Letters Patent.   Patented July 20, 1915.

Application filed May 16, 1914.  Serial No. 838,948.

*To all whom it may concern:*

Be it known that I, OSCAR B. MURPHY, a citizen of the United States, residing at Duke, in the county of Jackson and State of Oklahoma, have invented certain new and useful Improvements in Seed-Planting Mechanism, of which the following is a specification.

My invention relates to a new and useful seed planting mechanism, and more particularly to a mechanism especially adapted to plant cotton seed.

It is the object of my invention to provide a planting mechanism whereby seeds (and more particularly cotton seeds) will be dropped at equal spaced intervals along the row over which the planter travels, and the object more specifically stated is to provide a special form of planting wheel which when correlated with a novel guard plate will achieve the desired result.

A further object of my invention is to provide a device of the character described that will be strong, durable, simple and efficient and comparatively easy to construct and also one that will not be likely to get out of working order.

With these and various other objects in view, my invention has relation to certain novel features of the construction and operation, an example of which is described in the following specification and is illustrated in the accompanying drawings, wherein:

Figure 1 is a bottom view of a seed can with which my novel mechanism is shown correlated. Fig. 2 is an elevation view of the same, a portion of the seed can being broken away. Fig. 3 is a vertical axial sectional view of the same, the section being taken upon the line *x—x* of Fig. 1. Fig. 4 is a detail view of the seed wheel and guard which endow my mechanism with novelty. Fig. 5 is a detail perspective view of the guard plate.

Referring now more particularly to the drawing, wherein like reference characters designate similar parts in all the figures, the numeral 1 denotes an ordinary seed can, which is supported by a pair of parallel bars 1ª secured to its bottom. Through the seed can bottom there is centrally passed a short shaft 2, upon which an ordinary agitator plate 3 is mounted fixedly within the seed can. Beneath the seed can a large bevel gear 4 is mounted fixedly upon the shaft 2, said gear being contained within a dish shaped casing 5 secured to the bottom of the seed can. Diametrically beneath the casing 5, there is mounted a horizontal shaft 6, which is journaled in a pair of bearings 7 carried by the member 5 at opposite points on its periphery. Upon one of its extremities the shaft 6 carries a bevel pinion 8 which meshes with the gear 4, the casing 5 being apertured as indicated at 9 to receive the pinion 8. Upon the other extremity of the shaft 6, there is fixedly mounted a seed wheel 10, in which is formed a plurality of equidistant cells or notches 11. While the wheel illustrated is shown with only three of these notches, it is to be understood that with my mechanism there may be furnished a plurality of these wheels, each formed with a different number of notches.

The wheel 10 projects at its top through an aperture 12 formed in the bottom of the can 1 adjacent to the side wall, the rim portion of the agitator being revoluble just above said seed wheel. With the seed wheel there is correlated a guide plate 13, which is formed with a hook 14 passing through the aperture 12 and engaging on the bottom of the seed can. From said hook, a guide plate is curved downwardly closely adjacent to the rim of the wheel 10 through substantially ninety degrees. At one side of the wheel 10, a portion of the guide plate extends in segmental shape to the shaft 6 upon which it is hung. Upon the other side of the wheel 10, the plate 13 overhangs the lateral face of the wheel only for a short distance from the rim thereof. In order that the guard plate may be reversible it is formed with a hook 14 at its bottom as well as at its top.

From the foregoing description of my construction, the operation of the mechanism is evident. The direction of rotation to be communicated to the seed wheel is indicated by the arrow in Fig. 2. The notches 11 of the wheel 10 will be so proportioned that each will receive a certain number of seeds in passing across the aperture 12, the rotation of the agitator 3 serving to insure the delivery of the seeds into the notches 11. Each notch 11 after having been filled with seeds is carried by the continued rotation of the wheel 10 through the housing formed by the plate 13, and said plate will prevent discharge of the seeds from the notch until the notch has been carried clear of the plate 13, thus bringing it almost to the bottom of the wheel. When the seeds are discharged in this manner from the bottom of the wheel, they will fall straight down, and in every case will reach the ground in the same time interval, so that equal spaces will intervene in the row between each delivery of seeds thereto. Considering the velocity of rotation of the shaft 6 to be constant it is apparent that the space intervals between the hills of seeds may be increased or diminished by decreasing or increasing the number of equidistant notches in the wheel 10.

The invention is presented as including all such changes and modifications as properly come within the scope of the following claims.

What I claim is:

1. In a device of the character described, the combination with a seed can, of an agitator plate rotatably mounted adjacent to the bottom of said can, a seed wheel rotatably mounted beneath the seed can and formed with a plurality of equidistant notches in its rim, the axis of rotation of said wheel being horizontal, and its top being extended through the bottom of the seed can beneath the agitator rim, and a guard plate secured to the seed can bottom and forming an arc downwardly closely adjacent to a portion of the seed wheel rim, integral portions of the guard plate being extended toward the seed wheel center, one of which portions is mounted upon the seed wheel shaft.

2. The combination with a seed can, of an agitator plate rotatably mounted adjacent to the bottom of said can, a seed wheel mounted beneath the seed can and formed with a plurality of notches in its rim, the axis of rotation of said wheel being horizontal and its top being extended through the bottom of the seed can beneath the rim of the agitator, a guard plate secured adjacent to the seed wheel and means for securing either end of said guard plate to the bottom of the seed can.

In testimony whereof I have signed my name to this specification in the presence of two subscribing witnesses.

OSCAR B. MURPHY.

Witnesses:
B. C. ROSE,
M. G. HOLLEY.